(12) United States Patent
Kumar et al.

(10) Patent No.: US 10,757,487 B2
(45) Date of Patent: Aug. 25, 2020

(54) ACCELERATOR RESOURCE ALLOCATION AND POOLING

(71) Applicant: INTEL CORPORATION, Santa Clara, CA (US)

(72) Inventors: Mohan J. Kumar, Aloha, OR (US); Murugasamy K. Nachimuthu, Beaverton, OR (US); Aaron Gorius, Upton, MA (US); Michael Crocker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 648 days.

(21) Appl. No.: 15/396,151

(22) Filed: Dec. 30, 2016

(65) Prior Publication Data

US 2018/0024757 A1 Jan. 25, 2018

Related U.S. Application Data

(60) Provisional application No. 62/427,268, filed on Nov. 29, 2016, provisional application No. 62/376,859, (Continued)

(51) Int. Cl.
*G06F 9/46* (2006.01)
*H04Q 11/00* (2006.01)
(Continued)

(52) U.S. Cl.
CPC ...... *H04Q 11/0005* (2013.01); *B25J 15/0014* (2013.01); *B65G 1/0492* (2013.01); *G02B 6/3882* (2013.01); *G02B 6/3893* (2013.01); *G02B 6/3897* (2013.01); *G02B 6/4292* (2013.01); *G02B 6/4452* (2013.01); *G05D 23/1921* (2013.01); *G05D 23/2039* (2013.01); *G06F 1/183* (2013.01); *G06F 1/20* (2013.01); *G06F 3/061* (2013.01); *G06F 3/064* (2013.01); *G06F 3/067* (2013.01); *G06F 3/0611* (2013.01); *G06F 3/0613* (2013.01); *G06F 3/0616* (2013.01); *G06F 3/0619* (2013.01); *G06F 3/0625* (2013.01); *G06F 3/0631* (2013.01); (Continued)

(58) Field of Classification Search
CPC ............. H04Q 11/0005; G06F 16/9014; B25J 15/0014
See application file for complete search history.

(56) References Cited

U.S. PATENT DOCUMENTS 9,778,956 B1 * 10/2017 Harwood ............... G06F 9/5077
2011/0161972 A1 6/2011 Dillenberger et al.
(Continued)

OTHER PUBLICATIONS

International Search Report received for PCT Patent Application No. PCT/US2017/138646, dated Oct. 12, 2017, 4 pages.

*Primary Examiner* — Camquy Truong
(74) *Attorney, Agent, or Firm* — Barnes & Thornburg LLP

(57) ABSTRACT

Examples may include techniques to allocate physical accelerator resources from pools of accelerator resources. In particular, virtual computing devices can be composed from physical resources and physical accelerator resources dynamically allocated to the virtual computing devices. The present disclosure provides that physical accelerator resources can be dynamically allocated, or composed, to a virtual computing device despite not being physically coupled to other components in the virtual device.

25 Claims, 15 Drawing Sheets

Related U.S. Application Data filed on Aug. 18, 2016, provisional application No. 62/365,969, filed on Jul. 22, 2016.

(51) Int. Cl.

| | |
|---|---|
| G06F 1/20 | (2006.01) |
| G06F 16/901 | (2019.01) |
| G02B 6/38 | (2006.01) |
| G02B 6/42 | (2006.01) |
| G02B 6/44 | (2006.01) |
| G06F 1/18 | (2006.01) |
| G06F 3/06 | (2006.01) |
| G06F 8/65 | (2018.01) |
| G06F 9/30 | (2018.01) |
| G06F 9/38 | (2018.01) |
| G06F 9/4401 | (2018.01) |
| G06F 9/50 | (2006.01) |
| G06F 9/54 | (2006.01) |
| G06F 12/109 | (2016.01) |
| G06F 12/14 | (2006.01) |
| G06F 13/16 | (2006.01) |
| G06F 13/40 | (2006.01) |
| G08C 17/02 | (2006.01) |
| G11C 5/02 | (2006.01) |
| G11C 7/10 | (2006.01) |
| G11C 11/56 | (2006.01) |
| G11C 14/00 | (2006.01) |
| H03M 7/30 | (2006.01) |
| H03M 7/40 | (2006.01) |
| H04B 10/25 | (2013.01) |
| H04L 12/24 | (2006.01) |
| H04L 12/26 | (2006.01) |
| H04L 12/851 | (2013.01) |
| H04L 12/811 | (2013.01) |
| H04L 12/931 | (2013.01) |
| H04L 29/08 | (2006.01) |
| H04L 29/06 | (2006.01) |
| H05K 5/02 | (2006.01) |
| H05K 7/14 | (2006.01) |
| H04L 12/911 | (2013.01) |
| B25J 15/00 | (2006.01) |
| B65G 1/04 | (2006.01) |
| H05K 7/20 | (2006.01) |
| H04L 12/939 | (2013.01) |
| H04W 4/02 | (2018.01) |
| H04L 12/751 | (2013.01) |
| G06F 13/42 | (2006.01) |
| H05K 1/18 | (2006.01) |
| G05D 23/19 | (2006.01) |
| G05D 23/20 | (2006.01) |
| H04L 12/927 | (2013.01) |
| H05K 1/02 | (2006.01) |
| H04L 12/781 | (2013.01) |
| H04Q 1/04 | (2006.01) |
| G06F 12/0893 | (2016.01) |
| H05K 13/04 | (2006.01) |
| G11C 5/06 | (2006.01) |
| G06F 11/14 | (2006.01) |
| G06F 11/34 | (2006.01) |
| G06F 12/0862 | (2016.01) |
| G06F 15/80 | (2006.01) |
| H04L 12/919 | (2013.01) |
| G06F 12/10 | (2016.01) |
| G06Q 10/06 | (2012.01) |
| G07C 5/00 | (2006.01) |
| H04L 12/28 | (2006.01) |
| H04L 29/12 | (2006.01) |
| H04L 9/06 | (2006.01) |
| H04L 9/14 | (2006.01) |
| H04L 9/32 | (2006.01) |
| H04L 12/933 | (2013.01) |
| H04L 12/947 | (2013.01) |
| H04W 4/80 | (2018.01) |
| G06Q 10/08 | (2012.01) |
| G06Q 10/00 | (2012.01) |
| G06Q 50/04 | (2012.01) |

(52) U.S. Cl.
CPC .......... *G06F 3/0638* (2013.01); *G06F 3/0647* (2013.01); *G06F 3/0653* (2013.01); *G06F 3/0655* (2013.01); *G06F 3/0658* (2013.01); *G06F 3/0659* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/30036* (2013.01); *G06F 9/3887* (2013.01); *G06F 9/4401* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 9/544* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 12/109* (2013.01); *G06F 12/1408* (2013.01); *G06F 13/161* (2013.01); *G06F 13/1668* (2013.01); *G06F 13/1694* (2013.01); *G06F 13/409* (2013.01); *G06F 13/4022* (2013.01); *G06F 13/4068* (2013.01); *G06F 13/42* (2013.01); *G06F 13/4282* (2013.01); *G06F 15/8061* (2013.01); *G06F 16/9014* (2019.01); *G06Q 10/06* (2013.01); *G06Q 10/06314* (2013.01); *G07C 5/008* (2013.01); *G08C 17/02* (2013.01); *G11C 5/02* (2013.01); *G11C 5/06* (2013.01); *G11C 7/1072* (2013.01); *G11C 11/56* (2013.01); *G11C 14/0009* (2013.01); *H03M 7/30* (2013.01); *H03M 7/3084* (2013.01); *H03M 7/3086* (2013.01); *H03M 7/40* (2013.01); *H03M 7/4031* (2013.01); *H03M 7/4056* (2013.01); *H03M 7/4081* (2013.01); *H03M 7/6005* (2013.01); *H03M 7/6023* (2013.01); *H04B 10/2504* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/145* (2013.01); *H04L 41/147* (2013.01); *H04L 43/08* (2013.01); *H04L 43/0817* (2013.01); *H04L 43/0876* (2013.01); *H04L 43/0894* (2013.01); *H04L 43/16* (2013.01); *H04L 45/02* (2013.01); *H04L 45/52* (2013.01); *H04L 47/24* (2013.01); *H04L 47/38* (2013.01); *H04L 47/765* (2013.01); *H04L 47/782* (2013.01); *H04L 47/805* (2013.01); *H04L 47/82* (2013.01); *H04L 47/823* (2013.01); *H04L 49/00* (2013.01); *H04L 49/15* (2013.01); *H04L 49/25* (2013.01); *H04L 49/357* (2013.01); *H04L*

49/45 (2013.01); *H04L 49/555* (2013.01); *H04L 67/02* (2013.01); *H04L 67/10* (2013.01); *H04L 67/1004* (2013.01); *H04L 67/1008* (2013.01); *H04L 67/1012* (2013.01); *H04L 67/1014* (2013.01); *H04L 67/1029* (2013.01); *H04L 67/1034* (2013.01); *H04L 67/1097* (2013.01); *H04L 67/12* (2013.01); *H04L 67/16* (2013.01); *H04L 67/306* (2013.01); *H04L 67/34* (2013.01); *H04L 69/04* (2013.01); *H04L 69/329* (2013.01); *H04Q 1/04* (2013.01); *H04Q 11/00* (2013.01); *H04Q 11/0003* (2013.01); *H04Q 11/0062* (2013.01); *H04Q 11/0071* (2013.01); *H04W 4/023* (2013.01); *H05K 1/0203* (2013.01); *H05K 1/181* (2013.01); *H05K 5/0204* (2013.01); *H05K 7/1418* (2013.01); *H05K 7/1421* (2013.01); *H05K 7/1422* (2013.01); *H05K 7/1442* (2013.01); *H05K 7/1447* (2013.01); *H05K 7/1461* (2013.01); *H05K 7/1487* (2013.01); *H05K 7/1489* (2013.01); *H05K 7/1491* (2013.01); *H05K 7/1492* (2013.01); *H05K 7/1498* (2013.01); *H05K 7/2039* (2013.01); *H05K 7/20709* (2013.01); *H05K 7/20727* (2013.01); *H05K 7/20736* (2013.01); *H05K 7/20745* (2013.01); *H05K 7/20836* (2013.01); *H05K 13/0486* (2013.01); *G06F 2209/5019* (2013.01); *G06F 2209/5022* (2013.01); *G06F 2212/1008* (2013.01); *G06F 2212/1024* (2013.01); *G06F 2212/1041* (2013.01); *G06F 2212/1044* (2013.01); *G06F 2212/152* (2013.01); *G06F 2212/202* (2013.01); *G06F 2212/401* (2013.01); *G06F 2212/402* (2013.01); *G06F 2212/7207* (2013.01); *G06Q 10/087* (2013.01); *G06Q 10/20* (2013.01); *G06Q 50/04* (2013.01); *G08C 2200/00* (2013.01); *H04B 10/25* (2013.01); *H04L 41/12* (2013.01); *H04L 41/5019* (2013.01); *H04L 43/065* (2013.01); *H04Q 2011/0037* (2013.01); *H04Q 2011/0041* (2013.01); *H04Q 2011/0052* (2013.01); *H04Q 2011/0073* (2013.01); *H04Q 2011/0079* (2013.01); *H04Q 2011/0086* (2013.01); *H04Q 2213/13523* (2013.01); *H04Q 2213/13527* (2013.01); *H04W 4/80* (2018.02); *H05K 7/1485* (2013.01); *H05K 2201/066* (2013.01); *H05K 2201/10121* (2013.01); *H05K 2201/10159* (2013.01); *H05K 2201/10189* (2013.01); *Y02D 10/14* (2018.01); *Y02D 10/151* (2018.01); *Y02P 90/30* (2015.11); *Y04S 10/54* (2013.01); *Y10S 901/01* (2013.01)

(56) References Cited

U.S. PATENT DOCUMENTS

| | | |
|---|---|---|
| 2013/0152083 A1 | 6/2013 | Miki et al. |
| 2014/0280687 A1 | 9/2014 | Egi et al. |
| 2016/0139948 A1 | 5/2016 | Beveridge et al. |
| 2016/0179582 A1 | 6/2016 | Skerry et al. |
| 2016/0285722 A1* | 9/2016 | Min .................. H04L 47/20 |
| 2016/0321113 A1* | 11/2016 | Pinto ................ G06F 9/45533 |

* cited by examiner

*FIG. 12*

*Logic Flow*
*1200*

Compose a plurality of virtual computing resources from a plurality of physical compute resources and a plurality of physical accelerator resources, the plurality of physical compute resources coupled to the plurality of physical accelerator resources via a fabric.
*1210*

Dynamically allocate at least one of the plurality of physical accelerator resources to a one of the plurality of virtual computing resources.
*1220*

ACCELERATOR RESOURCE ALLOCATION AND POOLING

RELATED CASE

This application claims priority to U.S. Provisional Patent Application entitled "Framework and Techniques for Pools of Configurable Computing Resources" filed on Nov. 29, 2016 and assigned Ser. No. 62/427,268; U.S. Provisional Patent Application entitled "Scalable System Framework Prime (SSFP) Omnibus Provisional II" filed on Aug. 18, 2016 and assigned Ser. No. 62/376,859; and U.S. Provisional Patent Application entitled "Framework and Techniques for Pools of Configurable Computing Resources" filed on Jul. 22, 2016 and assigned Ser. No. 62/365,969, each of which is hereby incorporated by reference in their entirety.

TECHNICAL FIELD

Embodiments described herein generally relate to data centers and particularly to allocation of pooled accelerator resources within a data center.

BACKGROUND

Advancements in networking have enabled the rise in pools of physical resources. A pool of physical resources may be formed from a physical infrastructure including disaggregate physical resources, such as, for example, compute and storage resources found in large data centers. The physical infrastructure can include a number of computing systems having processors, memory, storage, networking, power, cooling, etc. Management entities of these data centers can aggregate a selection of the physical resources to form servers and/or physical computing hosts. These hosts can subsequently be allocated to execute system SW (e.g., OSs, VMMs, or the like) and host containers, VMs, and/or applications. However, as the number of configurable resources in the data center grows, it can be difficult to allocate and pool physical resources for particular tasks.

BRIEF DESCRIPTION OF THE DRAWINGS

FIG. 12 illustrates an example logic flow.

DETAILED DESCRIPTION

Data centers may be generally composed of a large number of racks that may contain numerous types of hardware or configurable resources (e.g., processing units, memory, storage, accelerators, networking, fans/cooling modules, power units, etc.). The types of hardware or configurable resources deployed in data centers may also be referred to as physical resources or disaggregate elements. It is to be appreciated, that the size and number of physical resources within a data center can be large, for example, on the order of hundreds of thousands of physical resources. Furthermore, these physical resources can be pooled to form virtual computing platforms for a large number and variety of computing tasks. The resource needs of these various tasks can vary. As such, the composition requirements of the virtual computing platforms can also vary. It is with respect to these and/or other challenges that the examples described herein are provided.

Figure 1:
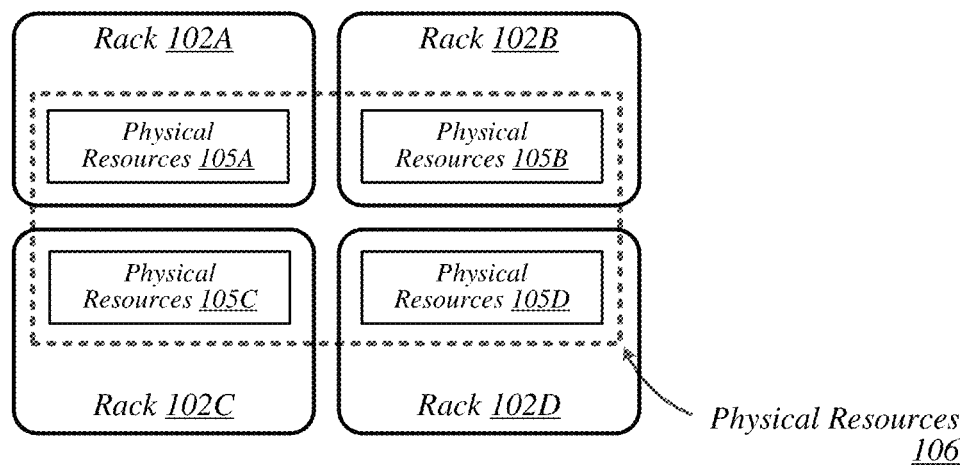
FIG. 1 illustrates a first example data center.

FIG. 1 illustrates a conceptual overview of a data center 100 that may generally be representative of a data center or other type of computing network in/for which one or more techniques described herein may be implemented according to various embodiments. As shown in this figure, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), graphics processing units (GPUs), memory, interconnect components, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twister pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A to 102D of the data center 100 may include physical design features that facilitate the automation of a variety of types of maintenance tasks. For example, data center 100 may be implemented using racks that are designed to be robotically-accessed, and to accept and house robotically-manipulable resource sleds. Furthermore, in some embodiments, the racks 102A to 102D include integrated power sources that receive a higher current than is typical for power sources. The increased current enables the power sources to provide additional power to the components on each sled, enabling the components to operate at higher than typical frequencies.

Figure 10:
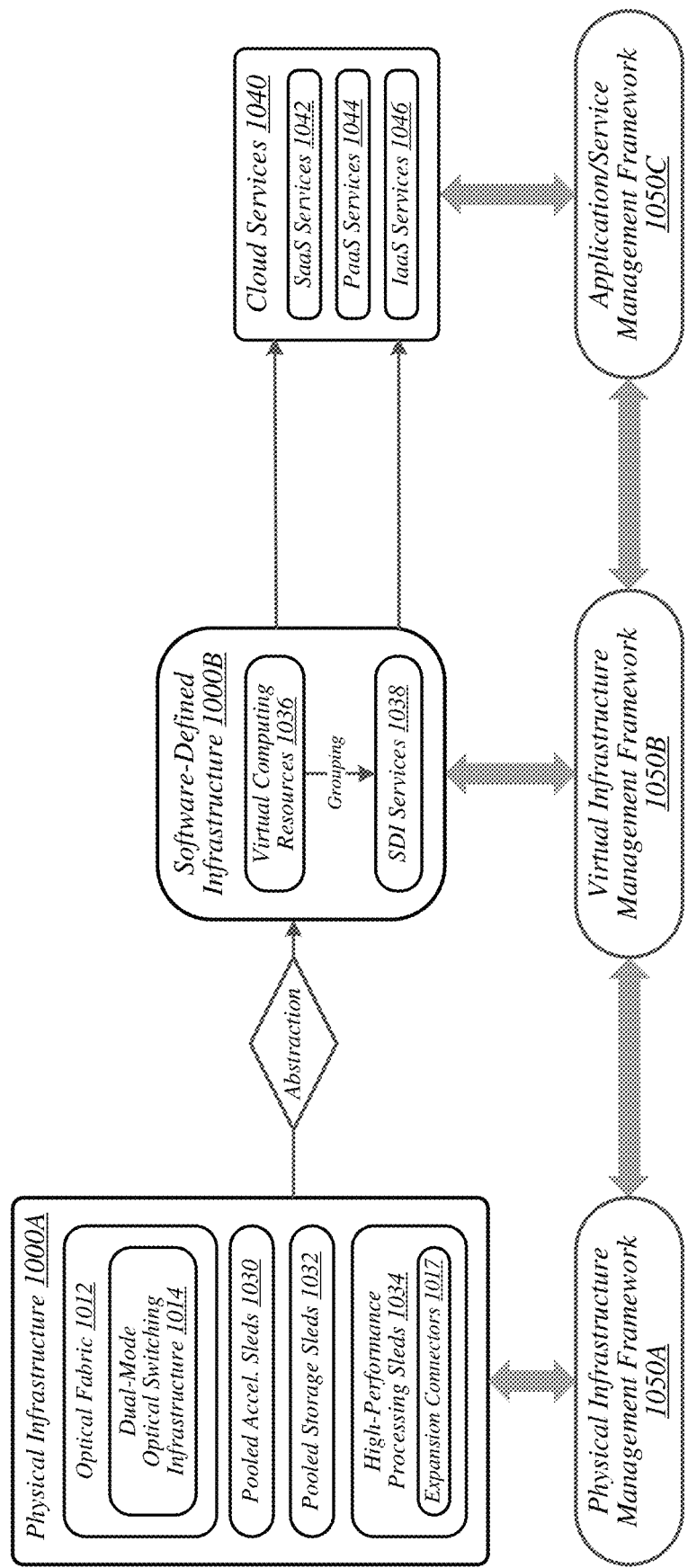
FIG. 10 illustrates a third example data center.
Figure 11A:
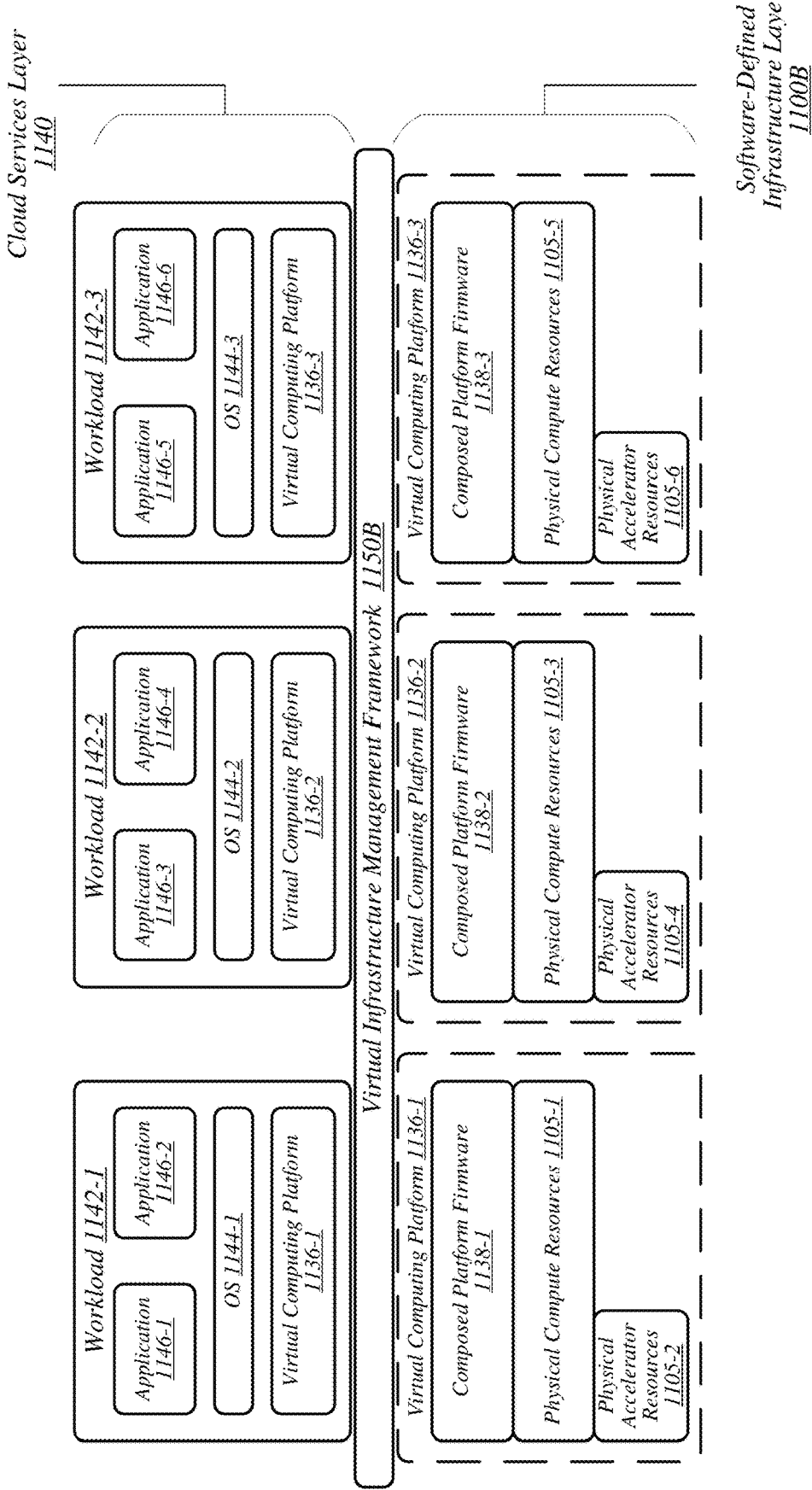
FIGS. 11A-11C illustrate example arrangements of a fourth example data center.
Figure 11B:
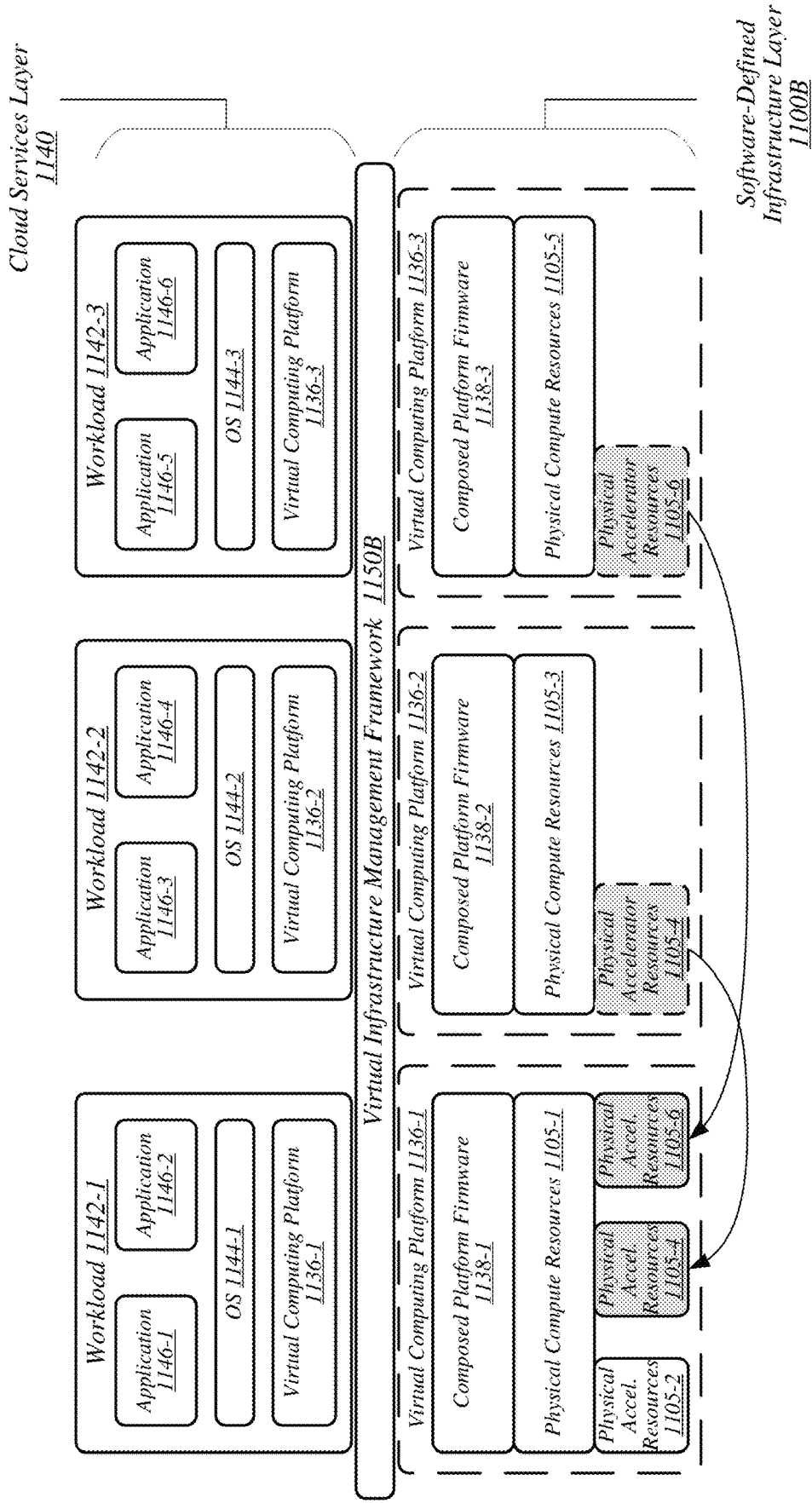
Figure 11C:
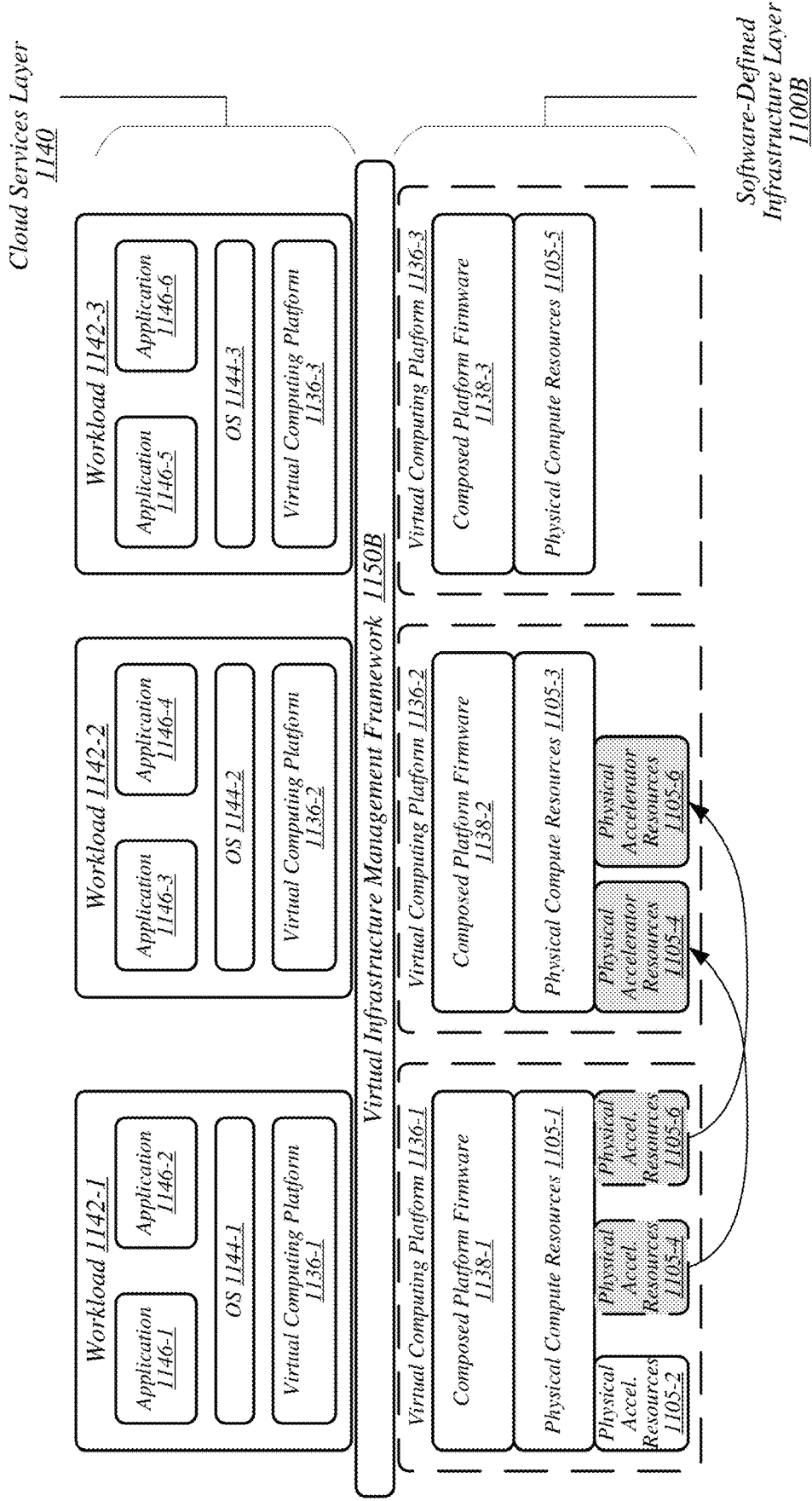

During operation, physical resources 106 can be composed into virtual computing platforms (e.g., refer to FIG. 11A, FIG. 11B and FIG. 11C). More specifically, particular types of physical resources (e.g., compute resources, memory resources, storage resources, accelerator resources, or the like) can be composed (e.g., organized, or the like) into virtual computing platforms. Furthermore, physical accelerator resources (e.g. refer to FIG. 2, or the like) can be dynamically allocated to the composed virtual computing platforms based on various needs of the data center. Said differently, the composition of the virtual computing platforms can be dynamically altered, and particularly, physical accelerator resources can be dynamically moved between different virtual computing platforms. It is important to note, that the dynamic allocation of physical accelerator resources can be provided independent of where, within the data center, the physical accelerator resources are located and/or coupled. This is described in greater detail below, for example, with reference to FIGS. 2-9, which describe illustrative portions of a data center; FIG. 10, which describes an illustrative management framework for a data center; and FIGS. 11A, 11B and 11C, which describe illustrative composed virtual computing platforms.

Figure 2:
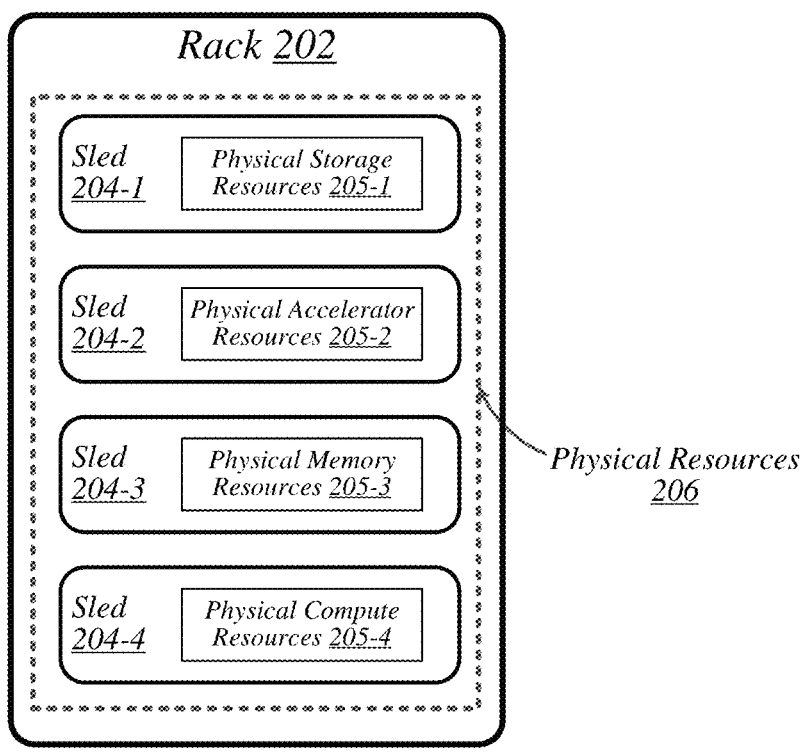
FIG. 2 illustrates a first example rack of a data center.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in this figure, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources 205-1 to 205-4 comprised in the sleds 204-1 to 204-4 of rack 202. As depicted in this illustrative embodiment, physical resources 205-1 to 205-4 include physical storage resources 205-1, physical accelerator resources 205-2, physical memory resources 205-3, and physical compute resources 205-4. The embodiments are not limited to this example. Each sled may contain a pool of each of the various types of physical resources (e.g., compute, memory, accelerator, storage). By having robotically accessible and robotically manipulable sleds comprising disaggregated resources, each type of resource can be upgraded independently of each other and at their own optimized refresh rate.

Furthermore, it is noted, the number of sleds 204-1 to 204-4 and the arrangement (e.g., column, row, etc.) is depicted at a quantity and in an arrangement to facilitate understanding. However, examples are not limited in these contexts.

During operation, virtual computing platforms (e.g., refer to FIG. 11A, FIG. 11B and FIG. 11C) can be composed from physical resources 206. Additionally, physical accelerator resources 205-2 can be dynamically allocated to (or composed with) different ones of the virtual computing platforms. Accordingly, data center 200 can be deployed with a set number of physical accelerator resources (e.g., physical accelerator resource 205-2, or the like) but compose virtual computing platforms and dynamically allocate ones of the number of physical accelerator resources to the virtual computing platforms to provide an increase in usage and/or utilization of the physical accelerator resources.

Figure 3:
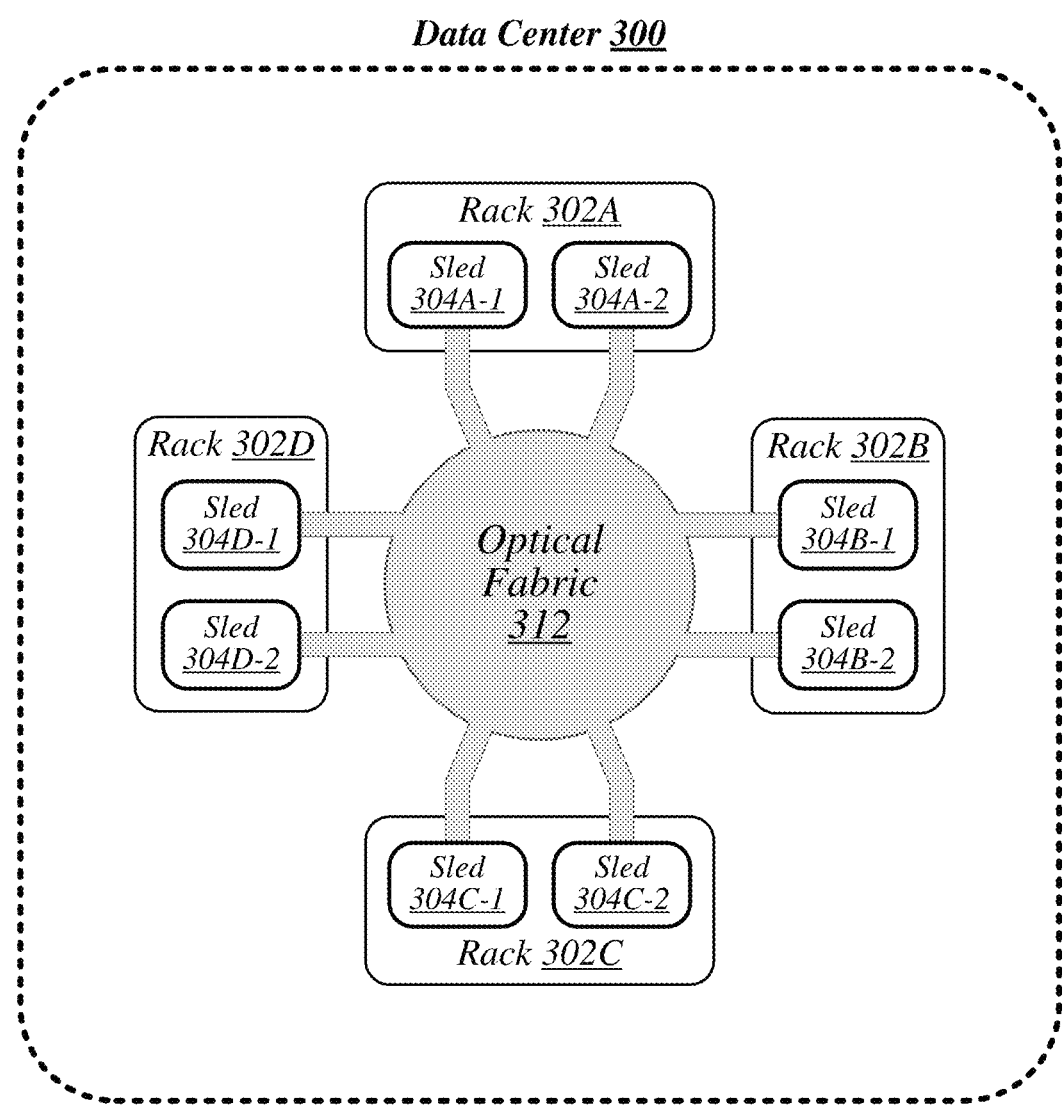
FIG. 3 illustrates a second example data center.

FIG. 3 illustrates an example of a data center 300 that may generally be representative of one in/for which one or more techniques described herein may be implemented according to various embodiments. As shown in this figure, data center 300 may feature an optical fabric 312. Optical fabric 312 may generally comprise a combination of optical signaling media (such as optical cabling) and optical switching infrastructure via which any particular sled in data center 300 can send signals to (and receive signals from) each of the other sleds in data center 300. The signaling connectivity that optical fabric 312 provides to any given sled may include connectivity both to other sleds in a same rack and sleds in other racks.

In the particular non-limiting example depicted here, data center 300 includes four racks 302A to 302D. Racks 302A to 302D house respective pairs of sleds 304A-1 and 304A-2, 304B-1 and 304B-2, 304C-1 and 304C-2, and 304D-1 and 304D-2. Thus, in this example, data center 300 comprises a total of eight sleds. Via optical fabric 312, each such sled may possess signaling connectivity with each of the seven other sleds in data center 300. For example, via optical fabric 312, sled 304A-1 in rack 302A may possess signaling connectivity with sled 304A-2 in rack 302A, as well as the six other sleds 304B-1, 304B-2, 304C-1, 304C-2, 304D-1, and 304D-2 that are distributed among the other racks 302B, 302C, and 302D of data center 300.

Figure 4:
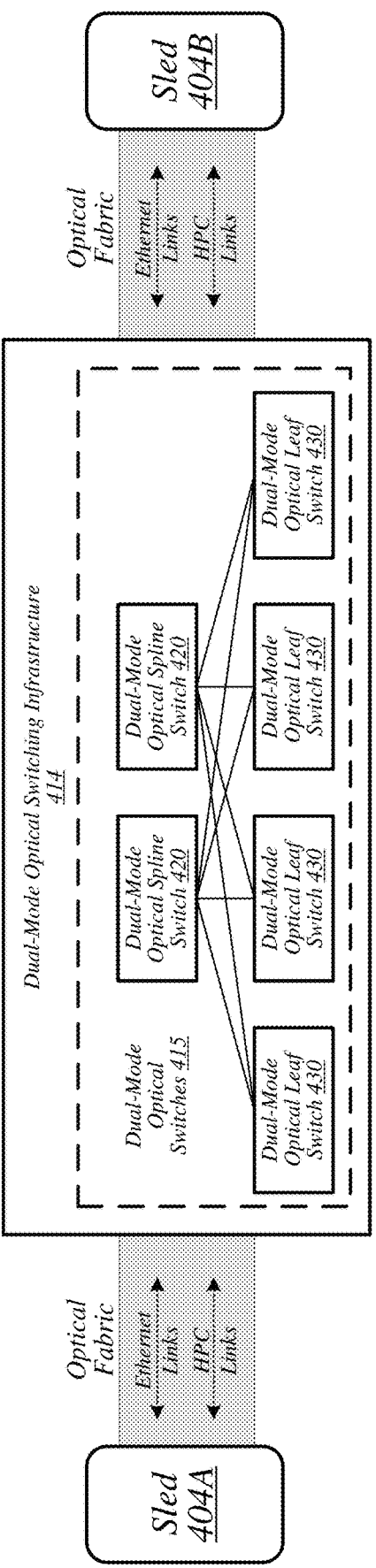
FIG. 4 illustrates a data center connectivity scheme.

FIG. 4 illustrates an overview of a connectivity scheme 400 that may generally be representative of link-layer connectivity that may be established in some embodiments among the various sleds of a data center, such as any of example data centers 100 and 300 of FIGS. 1 and 3. Connectivity scheme 400 may be implemented using an optical fabric that features a dual-mode optical switching infrastructure 414. Dual-mode optical switching infrastructure 414 may generally comprise a switching infrastructure that is capable of receiving communications according to multiple link-layer protocols via a same unified set of optical signaling media, and properly switching such communications. In various embodiments, dual-mode optical switching infrastructure 414 may be implemented using one or more dual-mode optical switches 415. In various embodiments, dual-mode optical switches 415 may generally comprise high-radix switches. In some embodiments, dual-mode optical switches 415 may comprise multi-ply switches, such as four-ply switches. In various embodiments, dual-mode optical switches 415 may feature integrated silicon photonics that enable them to switch communications with significantly reduced latency in comparison to conventional switching devices. In embodiments, the dual-mode switch may be a single physical network wire that may be capable of carrying Ethernet or Onmi-Path communication, which may be auto-detected by the dual-mode optical switch 515 or configured by the Pod management controller. This allows for the same network to be used for Cloud traffic (Ethernet) or High Performance Computing (HPC), typically Onmi-Path or Infiniband. Moreover, and in some instances, an Onmi-Path protocol may carry Onmi-Path communication and Ethernet communication. In some embodiments, dual-mode optical switches 415 may constitute leaf switches 430 in a leaf-spine architecture additionally including one or more dual-mode optical spine switches 420. Note that in some embodiments, the architecture may not be a leaf-spine architecture, but may be a two-ply switch architecture to connect directly to the sleds.

In various embodiments, dual-mode optical switches may be capable of receiving both Ethernet protocol communications carrying Internet Protocol (IP packets) and communications according to a second, high-performance computing (HPC) link-layer protocol (e.g., Omni-Path Architecture, Infiniband, or the like) via optical signaling media of an optical fabric. As reflected in this figure, with respect to any particular pair of sleds 404A and 404B possessing optical signaling connectivity to the optical fabric, connectivity scheme 400 may thus provide support for link-layer connectivity via both Ethernet links and HPC links. Thus, both Ethernet and HPC communications can be supported by a single high-bandwidth, low-latency switch fabric. The embodiments are not limited to this example.

Figure 5:
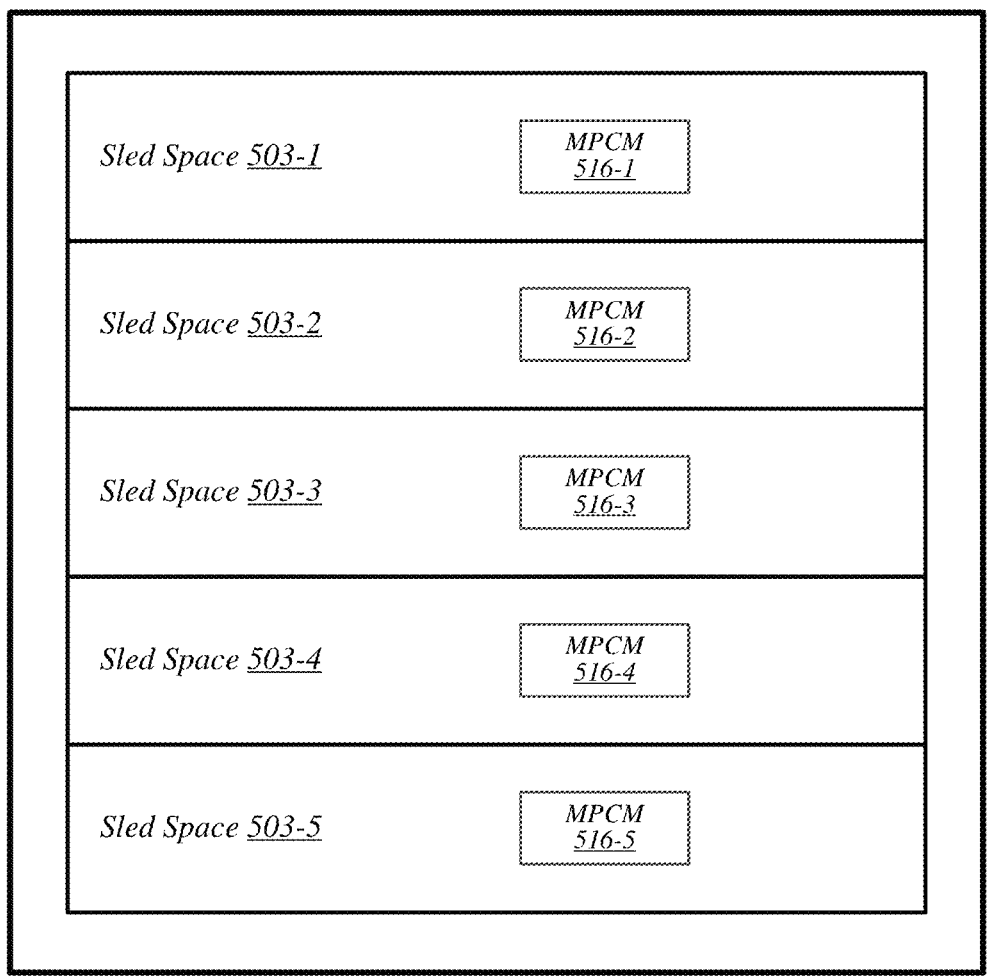
FIG. 5 illustrates a second example rack.

FIG. 5 illustrates a general overview of a rack architecture 500 that may be representative of an architecture of any particular one of the racks depicted herein. As reflected in this figure, rack architecture 500 may generally feature a plurality of sled spaces (or sled bays) into which sleds may be inserted, each of which may be robotically-accessible via a rack access region 501. In this particular non-limiting example, rack architecture 500 features five sled spaces 503-1 to 503-5. Sled spaces 503-1 to 503-5 feature respective multi-purpose connector modules (MPCMs) 516-1 to 516-5. When a sled is inserted into any given one of sled spaces 503-1 to 503-5, the corresponding MPCM may couple with a counterpart MPCM of the inserted sled. This coupling may provide the inserted sled with connectivity to both signaling infrastructure and power infrastructure of the rack in which it is housed. In some instances, when a sled is inserted into any given one of sled spaces 503-1 to 503-5, the corresponding MPCM may couple with a counterpart MPCM of the inserted sled. This coupling may provide the inserted sled with connectivity to both signaling infrastructure and power infrastructure of the rack in which it is housed.

Figure 6:
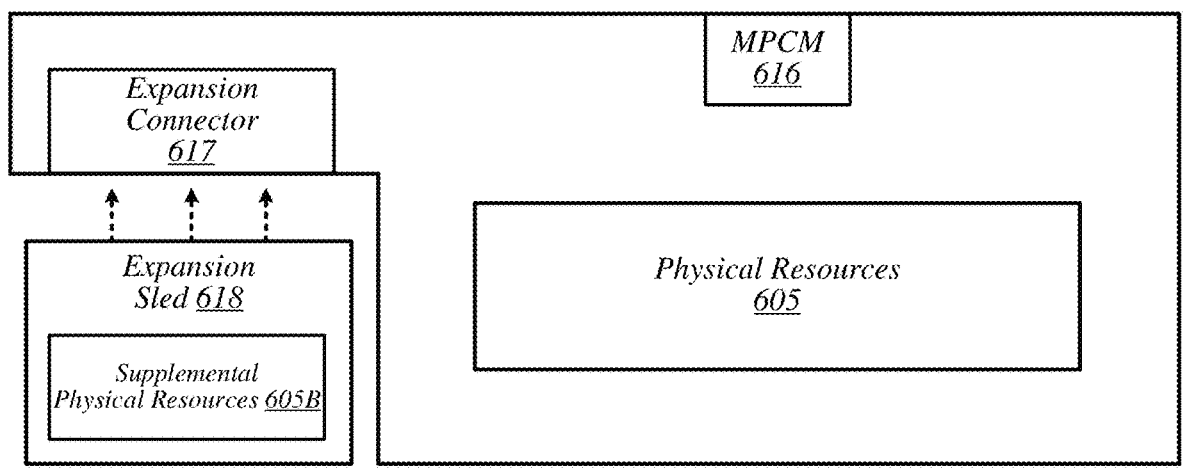
FIG. 6 illustrates a first example sled.

Included among the types of sleds to be accommodated by rack architecture 500 may be one or more types of sleds that feature expansion capabilities. FIG. 6 illustrates an example of a sled 604 that may be representative of a sled of such a type. As shown in this figure, sled 604 may comprise a set of physical resources 605, as well as an MPCM 616 designed to couple with a counterpart MPCM when sled 604 is inserted into a sled space such as any of sled spaces 503-1 to 503-5 of FIG. 5.

Sled 604 may also feature an expansion connector 617. Expansion connector 617 may generally comprise a socket, slot, or other type of connection element that is capable of accepting one or more types of expansion modules, such as an expansion sled 618. By coupling with a counterpart connector on expansion sled 618, expansion connector 617 may provide physical resources 605 with access to supplemental computing resources 605B residing on expansion sled 618. The embodiments are not limited in this context. In some examples, expansion sled 618 can comprise physical accelerator resources (e.g., comprising FPGAs, GPUs, memory, or a combination of FPGAs, GPUs, and memory.

Figure 7:
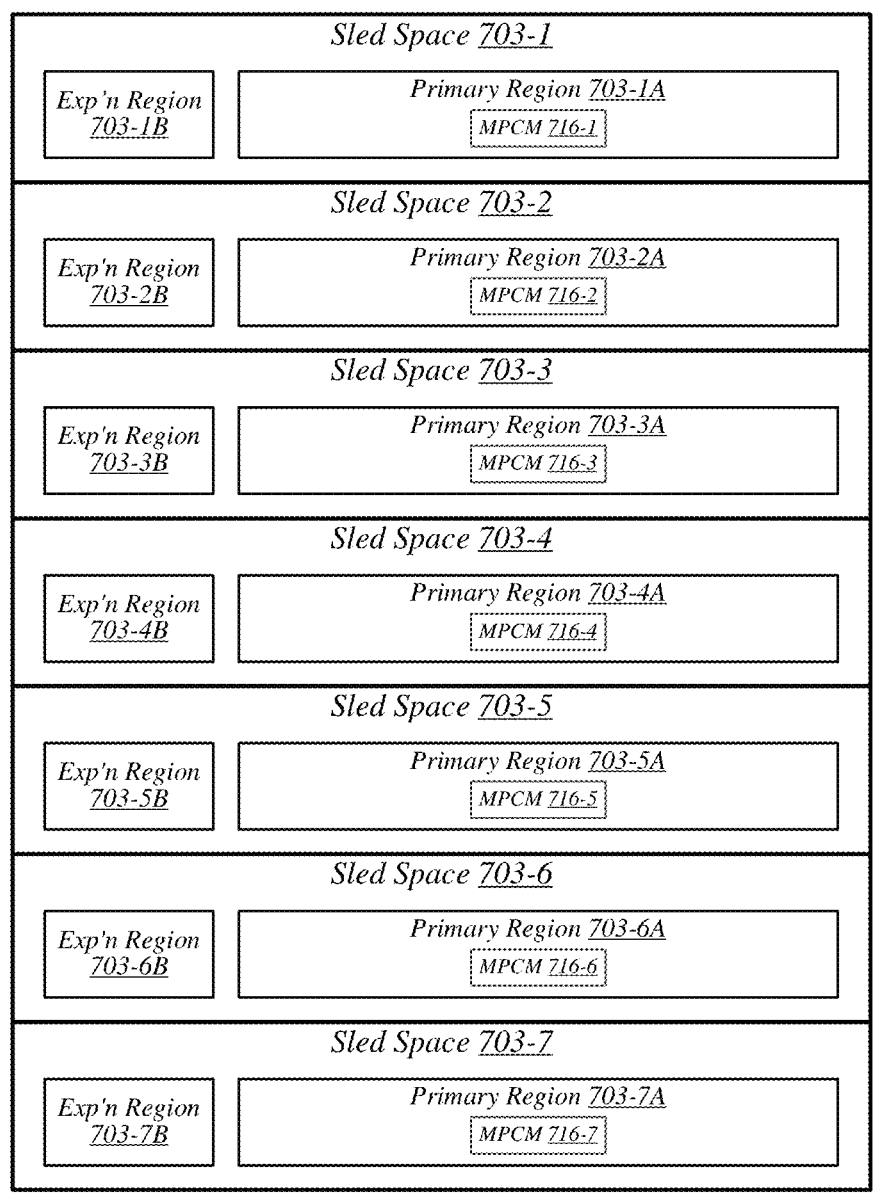
FIG. 7 illustrates a third example rack.

FIG. 7 illustrates an example of a rack architecture 700 that may be representative of a rack architecture that may be implemented in order to provide support for sleds featuring expansion capabilities, such as sled 604 of FIG. 6. In the particular non-limiting example depicted in FIG. 7, rack architecture 700 includes seven sled spaces 703-1 to 703-7, which feature respective MPCMs 716-1 to 716-7. Sled spaces 703-1 to 703-7 include respective primary regions 703-1A to 703-7A and respective expansion regions 703-1B to 703-7B.

With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 618 of FIG. 6, in the event that the inserted sled is configured with such a module.

Figure 8:
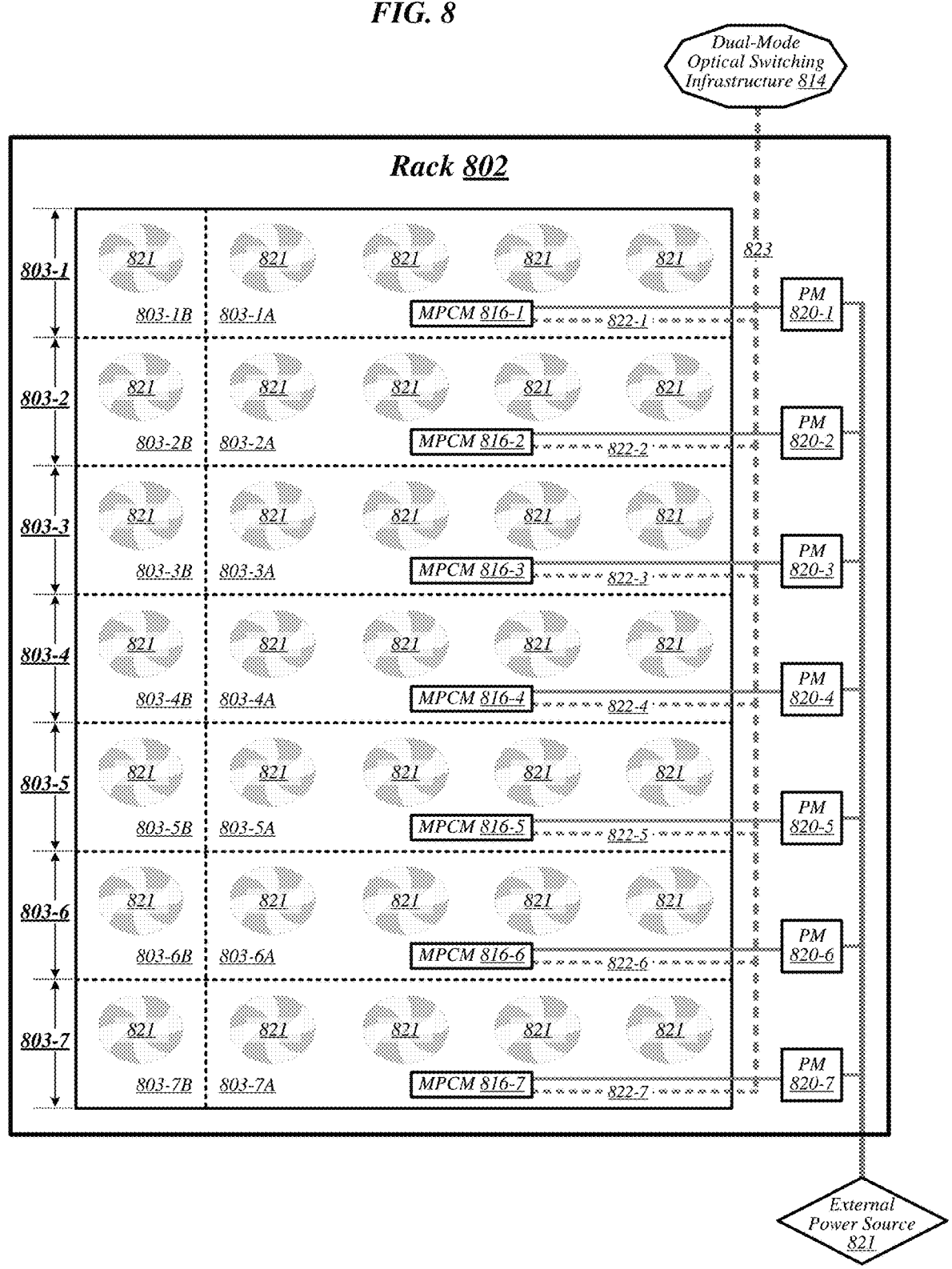
FIG. 8 illustrates a fourth example rack.

FIG. 8 illustrates an example of a rack 802 that may be representative of a rack implemented according to rack architecture 700 of FIG. 7 according to some embodiments. In the particular non-limiting example depicted in FIG. 8, rack 802 features seven sled spaces 803-1 to 803-7, which include respective primary regions 803-1A to 803-7A and respective expansion regions 803-1B to 803-7B. In various embodiments, temperature control in rack 802 may be implemented using an air cooling system. For example, as reflected in FIG. 8, rack 802 may feature a plurality of fans 819 that are generally arranged to provide air cooling within the various sled spaces 803-1 to 803-7. In some embodiments, the height of the sled space is greater than the conventional "1U" server height. In such embodiments, fans 819 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 816-1 to 816-7 may be configured to provide inserted sleds with access to power sourced by respective power modules 820-1 to 820-7, each of which may draw power from an external power source 821. In various embodiments, external power source 821 may deliver alternating current (AC) power to rack 802, and power modules 820-1 to 820-7 may be configured to convert such AC power to direct current (DC) power to be sourced to inserted sleds. In some embodiments, for example, power modules 820-1 to 820-7 may be configured to convert 277-volt AC power into 12-volt DC power for provision to inserted sleds via respective MPCMs 816-1 to 816-7. The embodiments are not limited to this example.

MPCMs 816-1 to 816-7 may also be arranged to provide inserted sleds with optical signaling connectivity to a dual-mode optical switching infrastructure 814, which may be the same as—or similar to—dual-mode optical switching infrastructure 414 of FIG. 4. In various embodiments, optical connectors contained in MPCMs 816-1 to 816-7 may be designed to couple with counterpart optical connectors contained in MPCMs of inserted sleds to provide such sleds with optical signaling connectivity to dual-mode optical switching infrastructure 814 via respective lengths of optical cabling 822-1 to 822-7. In some embodiments, each such length of optical cabling may extend from its corresponding MPCM to an optical interconnect loom 823 that is external to the sled spaces of rack 802. In various embodiments, optical interconnect loom 823 may be arranged to pass through a support post or other type of load-bearing element of rack 802. Because inserted sleds connect to an optical switching infrastructure via MPCMs, the resources typically spent in manually configuring the rack cabling to accommodate a newly inserted sled can be saved.

Figure 9:
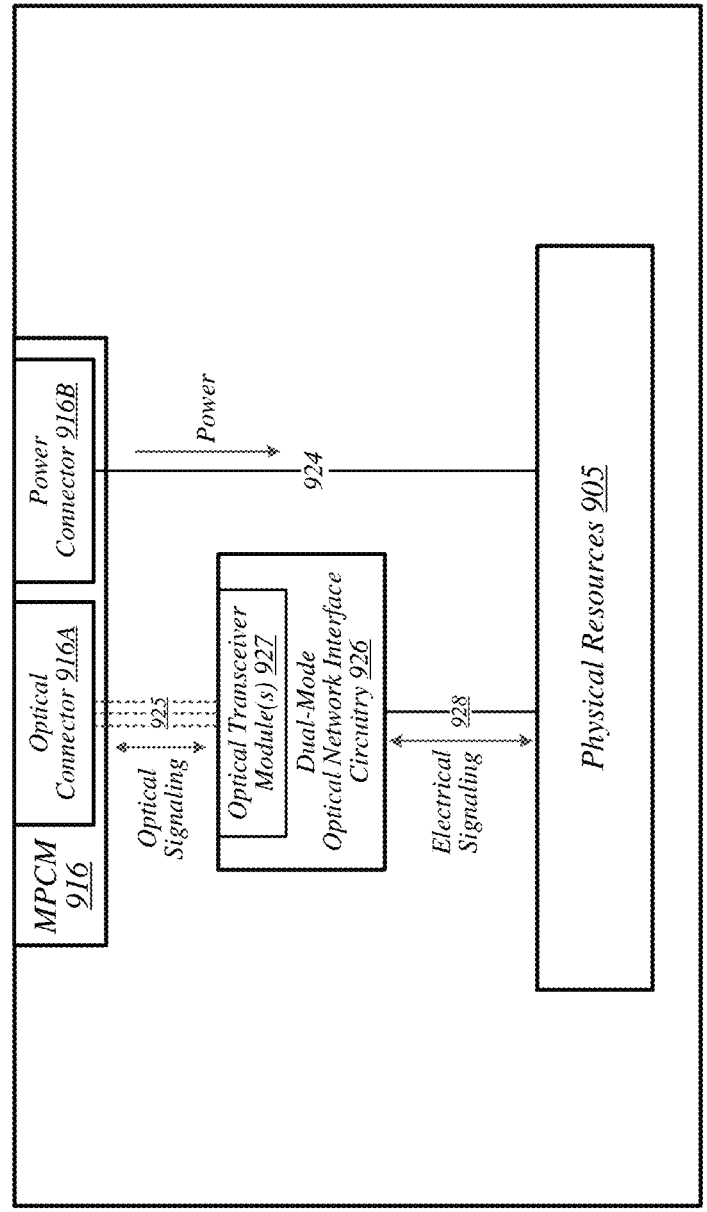
FIG. 9 illustrates a second example sled.

FIG. 9 illustrates an example of a sled 904 that may be representative of a sled designed for use in conjunction with rack 802 of FIG. 8 according to some embodiments. Sled 904 may feature an MPCM 916 that comprises an optical connector 916A and a power connector 916B, and that is designed to couple with a counterpart MPCM of a sled space in conjunction with insertion of MPCM 916 into that sled space. Coupling MPCM 916 with such a counterpart MPCM may cause power connector 916 to couple with a power connector comprised in the counterpart MPCM. This may generally enable physical resources 905 of sled 904 to source power from an external source, via power connector 916 and power transmission media 924 that conductively couples power connector 916 to physical resources 905.

Sled 904 may also include dual-mode optical network interface circuitry 926. Dual-mode optical network interface circuitry 926 may generally comprise circuitry that is capable of communicating over optical signaling media according to each of multiple link-layer protocols supported by dual-mode optical switching infrastructure 814 of FIG. 8. In some embodiments, dual-mode optical network interface circuitry 926 may be capable both of Ethernet protocol communications and of communications according to a second, high-performance protocol that offers significantly greater throughput and significantly reduced latency relative to Ethernet. In various embodiments, dual-mode optical network interface circuitry 926 may include one or more optical transceiver modules 927, each of which may be capable of transmitting and receiving optical signals over each of one or more optical channels. The embodiments are not limited in this context.

Coupling MPCM 916 with a counterpart MPCM of a sled space in a given rack may cause optical connector 916A to couple with an optical connector comprised in the counterpart MPCM. This may generally establish optical connectivity between optical cabling of the sled and dual-mode optical network interface circuitry 926, via each of a set of optical channels 925. Dual-mode optical network interface circuitry 926 may communicate with the physical resources 905 of sled 904 via electrical signaling media 928. In addition to the dimensions of the sleds and arrangement of components on the sleds to provide improved cooling and enable operation at a relatively higher thermal envelope (e.g., 250 W), as described above with reference to FIG. 8, in some embodiments, a sled may include one or more additional features to facilitate air cooling, such as a heat-pipe and/or heat sinks arranged to dissipate heat generated by physical resources 905. It is worthy of note that although the example sled 904 depicted in FIG. 9 does not feature an expansion connector, any given sled that features the design elements of sled 904 may also feature an expansion connector according to some embodiments.

FIG. 10 illustrates an example of a data center 1000 that may generally be representative of one in/for which one or more techniques described herein may be implemented according to various embodiments. As reflected in this figure, a physical infrastructure management framework 1050A may be implemented to facilitate management of a physical infrastructure 1000A of data center 1000. In various embodiments, one function of physical infrastructure management framework 1050A may be to manage automated maintenance functions within data center 1000, such as the use of robotic maintenance equipment to service computing equipment within physical infrastructure 1000A. In some embodiments, physical infrastructure 1000A may feature an advanced telemetry system that performs telemetry reporting that is sufficiently robust to support remote automated management of physical infrastructure 1000A. In various embodiments, telemetry information provided by such an advanced telemetry system may support features such as failure prediction/prevention capabilities and capacity planning capabilities. In some embodiments, physical infrastructure management framework 1050A may also be configured to manage authentication of physical infrastructure components using hardware attestation techniques. For example, robots may verify the authenticity of components before installation by analyzing information collected from a radio frequency identification (RFID) tag associated with each component to be installed.

As depicted, the physical infrastructure 1000A of data center 1000 may comprise an optical fabric 1012, which may include a dual-mode optical switching infrastructure 1014. Optical fabric 1012 and dual-mode optical switching infrastructure 1014 may be the same as—or similar to—optical fabric 312 of FIG. 3 and dual-mode optical switching infrastructure 414 of FIG. 4, respectively, and may provide high-bandwidth, low-latency, multi-protocol connectivity among sleds of data center 1000. As discussed above, with reference to FIG. 1, in various embodiments, the availability of such connectivity may make it feasible to disaggregate and dynamically pool resources such as processors, accelerators, memory, and storage. In some embodiments, for example, one or more pooled accelerator sleds 1030 may be included among the physical infrastructure 1000A of data center 1000, each of which may comprise a pool of accelerator resources—such as co-processors and/or FPGAs, for example—that is available globally accessible to other sleds via optical fabric 1012 and dual-mode optical switching infrastructure 1014.

In another example, in various embodiments, one or more pooled storage sleds 1032 may be included among the physical infrastructure 1000A of data center 1000, each of which may comprise a pool of storage resources that is available globally accessible to other sleds via optical fabric 1012 and dual-mode optical switching infrastructure 1014. In some embodiments, such pooled storage sleds 1032 may comprise pools of solid-state storage devices such as solid-state drives (SSDs). In various embodiments, one or more high-performance processing sleds 1034 may be included among the physical infrastructure 1000A of data center 1000. In some embodiments, high-performance processing sleds 1034 may comprise pools of high-performance processors, as well as cooling features that enhance air cooling to yield a higher thermal envelope of up to 250 W or more. In various embodiments, any given high-performance processing sled 1034 may feature an expansion connector 1017 that can accept a far memory expansion sled, such that the far memory that is locally available to that high-performance processing sled 1034 is disaggregated from the processors and near memory comprised on that sled. In some embodiments, such a high-performance processing sled 1034 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 4. The embodiments are not limited in this context.

In various embodiments, one or more layers of abstraction may be applied to the physical resources of physical infrastructure 1000A in order to define a virtual infrastructure, such as a software-defined infrastructure 1000B. In some embodiments, virtual computing resources 1036 of software-defined infrastructure 1000B may be allocated to support the provision of cloud services 1040. In various embodiments, particular sets of virtual computing resources 1036 may be grouped for provision to cloud services 1040 in the form of SDI services 1038. Examples of cloud services 1040 may include—without limitation—software as a service (SaaS) services 1042, platform as a service (PaaS) services 1044, and infrastructure as a service (IaaS) services 1046.

In some embodiments, management of software-defined infrastructure 1000B may be conducted using a virtual infrastructure management framework 1050B. In various embodiments, virtual infrastructure management framework 1050B may be designed to implement workload fingerprinting techniques and/or machine-learning techniques in conjunction with managing allocation of virtual computing resources 1036 and/or SDI services 1038 to cloud services 1040. In some embodiments, virtual infrastructure management framework 1050B may use/consult telemetry data in conjunction with performing such resource allocation. In various embodiments, an application/service management framework 1050C may be implemented in order to provide QoS management capabilities for cloud services 1040.

In particular, the virtual infrastructure management framework 1050B can compose virtual computing platforms (sometimes referred to as virtual computing devices) from elements of physical infrastructure 1000A. Furthermore, with some examples, ones of pooled accelerator sleds 1030 can be dynamically allocated to such virtual computing platforms, for example, to support various ones of cloud services 1040. The embodiments are not limited in this context.

FIGS. 11A, 11B and 11C illustrate examples of a data center 1100, with virtual computing platforms composed from physical resources of the data center. In general, virtual infrastructure management framework 1150B (e.g., a Hypervisor, or the like) can compose virtual computing platforms of software-defined infrastructure 1100B. For example, software-defined infrastructure 1100B includes virtual computing platform 1136-1, virtual computing platform 1136-2 and virtual computing platform 1136-3. The number of virtual computing platforms 1136 depicted in this figure, and their arrangement is given for illustration purposes only and not to be limiting. As described previously, the virtual computing platforms 1136-1 to 1136-3 are composed from physical resources (e.g., physical resources 206 of FIG. 2, or the like) of data center 1100. For example, virtual computing platform 1136-1 is depicted including physical compute resources 1105-1 and physical accelerator resources 1105-2; virtual computing platform 1136-2 is depicted including physical compute resources 1105-3 and physical accelerator resources 1105-4; and virtual computing platform 1136-3 is depicted including physical compute resources 1105-5 and physical accelerator resources 1105-6.

It is noted, the virtual computing platforms 1136 are not depicted including physical memory resources or physical storage resources, for purposes of clarity of presentation only. However, during practice, the virtual computing platforms 1136 can be composed with any number and combination of physical resources of the data center. Examples are not limited in this context.

In some examples, physical accelerator resources 1105 from a particular virtual computing platform 1136 can be coupled to the physical compute resources 1105 from that particular platform via an expansion slot. As a specific example, physical accelerator resources 1105-2 can be implemented on an expansion sled (e.g., expansion sled 618 of FIG. 6, or the like) and coupled to a sled implementing physical compute resources 1105-1 (e.g., sled 604 of FIG. 6) or the like.

The virtual computing platforms can be configured to implement firmware of operating system upon which services (e.g., SaaS, PaaS, IaaS, or the like) can be provided. As depicted, virtual computing platforms 1136-1 to 1136-3 implement virtual platform firmware 1138-1, 1138-2 and 1138-3, respectively. Virtual platform firmware 1138-1 to 1138-3 can be configured to facilitate cloud services layer 1140. Cloud service layer 1140 can be provided to execute various workloads (e.g., virtual machines, containers, or the like). For example, workloads 1142-1, 1142-2 and 1142-3 are depicted implemented upon virtual computing platforms 1136-1, 1136-2 and 1136-3, respectively. Workloads can implement an operating system (OS) and can execute various applications. For example, workload 1142-1 is depicted implementing OS 1144-1 and executing applications 1146-1 and 1146-2; workload 1142-2 is depicted implementing OS 1144-2 and executing applications 1146-3 and 1146-4; and workload 1142-3 is depicted implementing OS 1144-3 and executing applications 1146-5 and 1146-6.

During operation, as the needs of each workload change, the physical accelerator resources (e.g., physical resource 1105-2, 1105-4 and 1105-6) can be dynamically allocated to particular virtual computing platforms. For example, workloads 1142-1 to 1142-3 can have different computational requirements, be subject to different service level agreements, or the like. All of which, can change the needs and/or requirements of the data center 1100.

Turning more particularly to FIG. 11B, the virtual infrastructure management framework 1150B has dynamically allocated (e.g., during runtime, or the like) physical accelerator resources 1105-4 and 1105-6 to virtual computing platform 1136-1. Said differently, virtual infrastructure management framework 1150B can allocate physical accelerator resources 1105-4 and 1105-6 to virtual computing platform 1136-1. As such, even though physical accelerator resources 1105-4 and 1105-6 might be coupled (e.g., as expansion sleds, or the like) to physical compute resources composed in other virtual computing platforms (e.g., physical compute resources 1105-3 and 1105-5, or the like) the virtual computing platform 1136-1 can be composed to include the physical accelerator resources 1105-4 and 1105-6. Furthermore, it is worth noting that physical accelerator resources can be allocated to a virtual computing platform where the physical accelerator resources and the physical compute resources are on different sleds and even different racks. For example, physical compute resources 1105-1 could be on a different sled than any of the physical accelerator resources (e.g., 1105-2, 1105-4, 1105-6), despite such resources being composed into a single platform. Examples are not limited in this context.

Turning more particularly to FIG. 11C, the virtual infrastructure management framework 1150B has dynamically allocated (e.g., during runtime, or the like) physical accelerator resources 1105-4 and 1105-6 to virtual computing platform 1136-2. Said differently, virtual infrastructure management framework 1150B can allocate physical accelerator resources 1105-4 and 1105-6 to virtual computing platform 1136-2. As such, even though physical accelerator resource 1105-6 might be coupled (e.g., as expansion sleds, or the like) to physical compute resources composed in other virtual computing platforms (e.g., physical compute resource 1105-5, or the like) the virtual computing platform 1136-1 can be composed to include the physical accelerator resources 1105-4 and 1105-6. Additionally, although physical accelerator resources 1105-4 and 1105-6 might have been included, allocated and/or composed with virtual computing platform 1136-1, they can be dynamically allocated to another platform, such as, for example, virtual computing platform 1136-2.

With some examples, the physical accelerator resources 1105-4 and 1105-6 can be coupled to physical compute resource 1105-1 via an optical fabric (e.g., optical fabric 312, or the like). Accordingly, any one of the virtual computing platforms can be composed with and/or dynamically allocated any number of the physical accelerator resources within data center 1100.

It is noted, the present disclosure provides an advantage over prior art such data centers in that less physical accelerator resources are needed within a data center. More specifically, a virtual computing platform can be dynamically allocated physical accelerator resources, regardless of whether the accelerator resources are physically attached and/or coupled to the compute resources allocated to the platform. Such allocations can be dynamic and take place during run time of the data center. Said differently, the physical accelerator resources can be allocated to a virtual compute platform without recomposing the platform. As such, data centers implemented according to the present disclosure can be provisioned with less total physical accelerator resources than conventional data centers but provide greater performance. More specifically, a data center (e.g., data center 1100) can be provisioned with the number of physical accelerator resources that might be simultaneously needed by workloads (e.g., workloads 1142-1, 1142-2, 1142-3, or the like). Conversely, with conventional techniques, the data center would need to be provisioned with the total number of physical accelerator resources that each workload would need.

It is worth noting, the present disclosure provides such an advantage due to the optical fabric, which couples physical resources of the data center, such as, physical compute resources and physical accelerator resources. For example, physical resources of the data center can be coupled via optical fabric (e.g., optical fabric 312 of FIG. 3) and in some cases, a single optical switch.

Included herein is a logic flow representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 12 illustrates an example logic flow 1200. Logic flow 1200 may be representative of some or all of the operations executed by one or more logic, features, or devices described herein, such as apparatus 1050B, 1150B, or the like. More particularly, logic flow 1200 may be implemented by at least virtual infrastructure management framework 1150B to dynamically allocate accelerator resources to a virtual computing platform.

Logic flow 1200 can begin at block 1210. At block 1210 "compose a plurality of virtual computing resources from a plurality of physical compute resources and a plurality of physical accelerator resources, the plurality of physical compute resources coupled to the plurality of physical accelerator resources via a fabric" virtual computing resources can be composed from physical compute resources and physical accelerator resources. For example, virtual infrastructure management framework can compose virtual computing platforms from physical resources. As a specific example, virtual infrastructure management framework 1150B can compose virtual computing platforms 1136-1, 1136-2 and 1136-3. Each virtual computing platform can be composed from at least one physical compute resource and one physical accelerator resources. For example, a virtual computing platform (e.g., 1136-1, 1136-2, 1136-3, or the like) can be composed from a sled (e.g., sled 604, or the like) comprising a physical compute resource (e.g., physical resource 605 can be a compute resource) and a physical accelerator resource (e.g., expansion sled 618 having supplemental physical resources 605B can be an accelerator resource).

Continuing to block 1220 "dynamically allocate at least one of the plurality of physical accelerator resources to a one of the plurality of virtual computing resources" one of the physical accelerator resources can be dynamically allocated to a one (e.g., a different one than presently allocated) of the virtual computing resources. For example, as depicted in FIG. 11B, virtual infrastructure management framework 1150B can dynamically allocate physical accelerator resources 1105-4 and 1105-6 from virtual computing platforms 1136-2 and 1136-3 to virtual computing platform 1136-1.

Figure 13:
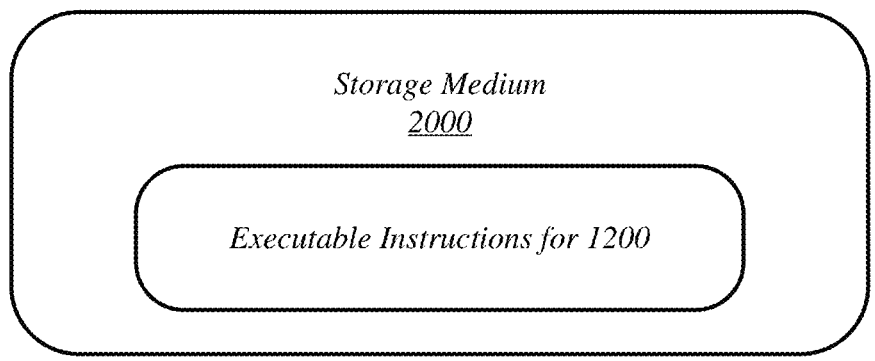
FIG. 13 illustrates an example of a storage medium.

FIG. 13 illustrates an example of a storage medium 2000. Storage medium 2000 may comprise an article of manufacture. In some examples, storage medium 2000 may include any non-transitory computer readable medium or machine readable medium, such as an optical, magnetic or semiconductor storage. Storage medium 2000 may store various types of computer executable instructions, such as instructions to implement logic flow 1300. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 14:
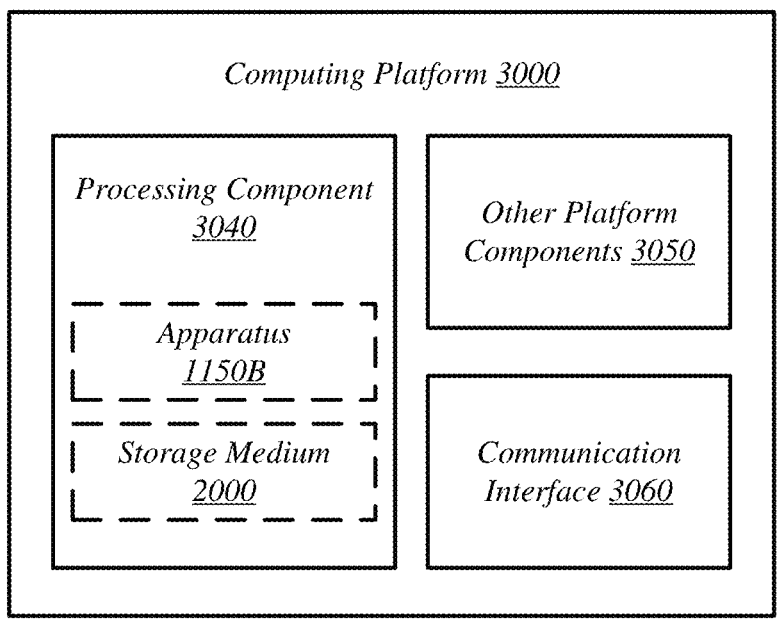
FIG. 14 illustrates an example computing platform.

FIG. 14 illustrates an example computing platform 3000. In some examples, as shown in this figure, computing platform 3000 may include a processing component 3040, other platform components or a communications interface 3060. According to some examples, computing platform 3000 may be implemented in a computing device such as a server in a system such as a data center or server farm that supports a manager or controller for managing configurable computing resources as mentioned above.

According to some examples, processing component 3040 may execute processing operations or logic for apparatus 1132/1134 and/or storage medium 2000. Processing component 3040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 3050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 3060 may include logic and/or features to support a communication interface. For these examples, communications interface 3060 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 3000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 3000 described herein, may be included or omitted in various embodiments of computing platform 3000, as suitably desired.

The components and features of computing platform 3000 may be implemented using any combination of discrete circuitry, ASICs, logic gates and/or single chip architectures. Further, the features of computing platform 3000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 3000 shown in the block diagram of this figure may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Example 1

A data center comprising: a plurality of physical compute resources; a plurality of physical accelerator resources; a fabric to communicatively couple the plurality of physical compute resources and the plurality of physical accelerator resources; and a virtual infrastructure management framework to: compose a plurality of virtual computing platforms from the plurality of physical compute resources and the plurality of physical accelerator resources; and dynamically allocate at least one of the plurality of physical accelerator resources to a one of the plurality of virtual computing platforms.

Example 2

The data center of example 1, comprising a plurality of physical storage resources, the virtual infrastructure management framework to compose the plurality of virtual computing resources from the plurality of physical compute resources, the plurality of physical accelerator resources and the plurality of physical storage resources.

Example 3

The data center of example 1, comprising a plurality of physical memory resources, the virtual infrastructure management framework to compose the plurality of virtual computing resources from the plurality of physical compute resources, the plurality of physical accelerator resources and the plurality of physical memory resources.

Example 4

The data center example 1, a first one of the plurality of virtual computing resources to comprise a first one of the physical compute resources and a first one of the physical accelerator resources; and a second one of the plurality of virtual computing resources to comprise a second one of the physical compute resources and a second one of the physical accelerator resources, the virtual infrastructure management framework to dynamically allocate the second one of the plurality of physical accelerator resources from the second virtual computing resource to the first virtual computing resource.

Example 5

The data center of example 4, a third one of the plurality of virtual computing resources to comprise a third one of the physical compute resources and a third one of the physical accelerator resources, the virtual infrastructure management framework to dynamically allocate the third one of the plurality of physical accelerator resources from the third virtual computing resource to the first virtual computing resource.

Example 6

The data center of any one of examples 1 to 5, the virtual infrastructure management framework to dynamically allocate at least one of the plurality of physical accelerator resources based on a service level agreement for the plurality of virtual computing resources.

Example 7

The data center of any one of examples 1 to 5, the virtual infrastructure management framework to dynamically allocate at least one of the plurality of physical accelerator resources based on a resource utilization of one or more of the plurality of virtual computing resources.

Example 8

The data center of any one of examples 1 to 5, the plurality of accelerator resources comprising field programmable gate arrays.

Example 9

The data center of any one of examples 1 to 5, the virtual infrastructure manager framework comprising a data center hypervisor.

Example 10

The data center of example 9, the data center hypervisor to present each of the plurality of virtual computing resources as host computing systems.

Example 11

The data center of any one of examples 1 to 5, comprising a plurality of power supplies coupled to the plurality of physical compute resources and the plurality of physical accelerator resources.

Example 12

The data center of any one of examples 1 to 5, wherein the fabric is an optical fabric.

Example 13

The data center of any one of examples 1 to 5, wherein the fabric is configured to enable communication via a plurality of communication protocols.

Example 14

The data center of example 13, wherein the plurality of communication protocols comprises at least Ethernet and Omni-Path.

Example 15

A method for a data center, the method comprising: composing a plurality of virtual computing resources from a plurality of physical compute resources and a plurality of physical accelerator resources, the plurality of physical compute resources coupled to the plurality of physical accelerator resources via a fabric; and dynamically allocating at least one of the plurality of physical accelerator resources to a one of the plurality of virtual computing resources.

Example 16

The method of example 15, comprising composing the plurality of virtual computing resources from the plurality of physical compute resources, the plurality of physical accelerator resources and a plurality of physical storage resources.

Example 17

The method of example 15, comprising composing the plurality of virtual computing resources from the plurality of physical compute resources, the plurality of physical accelerator resources and a plurality of physical memory resources.

Example 18

The method example 15, a first one of the plurality of virtual computing resources to comprise a first one of the physical compute resources and a first one of the physical accelerator resources; and a second one of the plurality of virtual computing resources to comprise a second one of the physical compute resources and a second one of the physical accelerator resources, the method comprising dynamically allocating the second one of the plurality of physical accelerator resources from the second virtual computing resource to the first virtual computing resource.

Example 19

The method of example 18, a third one of the plurality of virtual computing resources to comprise a third one of the physical compute resources and a third one of the physical accelerator resources, the method comprising dynamically allocating the third one of the plurality of physical accelerator resources from the third virtual computing resource to the first virtual computing resource.

Example 20

The method of any one of examples 15 to 19, comprising dynamically allocating at least one of the plurality of physical accelerator resources based on a service level agreement for the plurality of virtual computing resources.

Example 21

The method of any one of examples 15 to 19, comprising dynamically allocating at least one of the plurality of physical accelerator resources based on a resource utilization of one or more of the plurality of virtual computing resources.

Example 22

The method of any one of examples 15 to 19, the plurality of accelerator resources comprising field programmable gate arrays.

Example 23

The method of any one of examples 15 to 19, comprising composing the plurality of virtual computing resources at a data center hypervisor.

Example 24

The method of any one of examples 15 to 19, comprising presenting each of the plurality of virtual computing resources as a host computing system.

Example 25

The method of any one of examples 15 to 19, wherein the fabric is an optical fabric.

Example 26

The method of any one of examples 15 to 19, comprising communicating over the fabric via a plurality of communication protocols.

Example 27

The method of example 26, wherein the plurality of communication protocols comprises at least Ethernet and Omni-Path.

Example 28

At least one machine readable medium comprising a plurality of instructions that in response to being executed by a virtual infrastructure management framework of a data center cause the virtual infrastructure management framework to: compose a plurality of virtual computing resources from a plurality of physical compute resources and a plurality of physical accelerator resources, the plurality of physical compute resources coupled to the plurality of physical accelerator resources via a fabric; and dynamically allocate at least one of the plurality of physical accelerator resources to a one of the plurality of virtual computing resources.

Example 29

The at least one machine readable medium of example 28, comprising instructions that in response to being executed by the virtual infrastructure management framework cause the virtual infrastructure management framework to compose the plurality of virtual computing resources from the plurality of physical compute resources, the plurality of physical accelerator resources and a plurality of physical storage resources.

Example 30

The at least one machine readable medium of example 28, comprising instructions that in response to being executed by the virtual infrastructure management framework cause the virtual infrastructure management framework to compose the plurality of virtual computing resources from the plurality of physical compute resources, the plurality of physical accelerator resources and a plurality of physical memory resources.

Example 31

The at least one machine readable medium of example 28, a first one of the plurality of virtual computing resources to comprise a first one of the physical compute resources and a first one of the physical accelerator resources; and a second one of the plurality of virtual computing resources to comprise a second one of the physical compute resources and a second one of the physical accelerator resources, the medium comprising instructions that in response to being executed by the virtual infrastructure management framework cause the virtual infrastructure management framework to dynamically allocate the second one of the plurality of physical accelerator resources from the second virtual computing resource to the first virtual computing resource.

Example 32

The at least one machine readable medium of example 31, a third one of the plurality of virtual computing resources to comprise a third one of the physical compute resources and a third one of the physical accelerator resources, the medium comprising instructions that in response to being executed by the virtual infrastructure management framework cause the virtual infrastructure management framework to dynamically allocate the third one of the plurality of physical accelerator resources from the third virtual computing resource to the first virtual computing resource.

Example 33

The at least one machine readable medium of any one of examples 28 to 32, comprising instructions that in response to being executed by the virtual infrastructure management framework cause the virtual infrastructure management framework to dynamically allocate at least one of the plurality of physical accelerator resources based on a service level agreement for the plurality of virtual computing resources.

Example 34

The at least one machine readable medium of any one of examples 28 to 32, comprising instructions that in response to being executed by the virtual infrastructure management framework cause the virtual infrastructure management framework to dynamically allocate at least one of the plurality of physical accelerator resources based on a resource utilization of one or more of the plurality of virtual computing resources.

Example 35

The at least one machine readable medium of any one of examples 28 to 32, the plurality of accelerator resources comprising field programmable gate arrays.

Example 36

The at least one machine readable medium of any one of examples 28 to 32, comprising instructions that in response to being executed by the virtual infrastructure management framework cause the virtual infrastructure management framework to present each of the plurality of virtual computing resources as a host computing system.

Example 37

The at least one machine readable medium of any one of examples 28 to 32, wherein the machine readable medium is non-transitory.

Example 38

The at least one machine readable medium of any one of examples 28 to 32, wherein the fabric is an optical fabric.

Example 39

The at least one machine readable medium of any one of examples 28 to 32, comprising instructions that in response to being executed by the virtual infrastructure management framework cause the virtual infrastructure management framework to communicate over the fabric via a plurality of communication protocols.

Example 40

The at least one machine readable medium of example 39, wherein the plurality of communication protocols comprises at least Ethernet and Omni-Path.

Example 41

A data center comprising: a plurality of physical compute means; a plurality of physical accelerator means; a fabric means to communicatively couple the plurality of physical compute means and the plurality of physical accelerator means; and a virtual infrastructure management means to: compose a plurality of virtual computing means from the plurality of physical compute means and the plurality of physical accelerator means; and dynamically allocate at least one of the plurality of physical accelerator means to a one of the plurality of virtual computing means.

Example 42

The data center of example 41, comprising a plurality of physical storage means, the virtual infrastructure management means to compose the plurality of virtual computing means from the plurality of physical compute means, the plurality of physical accelerator means and the plurality of physical storage means.

Example 43

The data center of example 41, comprising a plurality of physical memory resources, the virtual infrastructure management framework to compose the plurality of virtual computing resources from the plurality of physical compute resources, the plurality of physical accelerator resources and the plurality of physical memory resources.

Example 44

The data center example 41, a first one of the plurality of virtual computing resources to comprise a first one of the physical compute resources and a first one of the physical accelerator resources; and a second one of the plurality of virtual computing resources to comprise a second one of the physical compute resources and a second one of the physical accelerator resources, the virtual infrastructure management framework to dynamically allocate the second one of the plurality of physical accelerator resources from the second virtual computing resource to the first virtual computing resource.

Example 45

The data center of example 44, a third one of the plurality of virtual computing resources to comprise a third one of the physical compute resources and a third one of the physical accelerator resources, the virtual infrastructure management framework to dynamically allocate the third one of the plurality of physical accelerator resources from the third virtual computing resource to the first virtual computing resource.

Example 46

The data center of any one of examples 41 to 45, the virtual infrastructure management framework to dynamically allocate at least one of the plurality of physical accelerator resources based on a service level agreement for the plurality of virtual computing resources.

Example 47

The data center of any one of examples 41 to 45, the virtual infrastructure management framework to dynamically allocate at least one of the plurality of physical accelerator resources based on a resource utilization of one or more of the plurality of virtual computing resources.

Example 48

The data center of any one of examples 41 to 45, plurality of accelerator resources comprising field programmable gate arrays.

Example 49

The data center of any one of examples 41 to 45, the virtual infrastructure manager framework comprising a data center hypervisor.

Example 50

The data center of example 49, the data center hypervisor to present each of the plurality of virtual computing resources as host computing systems.

Example 51

The data center of any one of examples 41 to 45, comprising a plurality of power supplies coupled to the plurality of physical compute resources and the plurality of physical accelerator resources.

Example 52

The data center of any one of examples 41 to 45, wherein the fabric is an optical fabric.

Example 53

The data center of any one of examples 41 to 45, wherein the fabric is configured to enable communication via a plurality of communication protocols.

Example 54

The data center of example 53, wherein the plurality of communication protocols comprises at least Ethernet and Omni-Path.

The invention claimed is:

1. A system comprising:
   a first computing sled comprising a first plurality of physical compute resources;
   a second computing sled comprising a first plurality of physical accelerator resources;
   a third computing sled comprising a second plurality of physical compute resources;
   a fourth computing sled comprising a second plurality of physical accelerator resources;
   a fabric to communicatively couple the first plurality of physical compute resources and the first plurality of physical accelerator resources and communicatively couple the second plurality of physical compute resources and the second plurality of physical accelerator resources; and
   a virtual infrastructure management framework to:
      compose a first virtual computing platform from the first plurality of physical compute resources and the first plurality of physical accelerator resources;
      compose a second virtual computing platform from the second plurality of physical compute resources and the second plurality of accelerator resources; and
      dynamically allocate at least one of the first plurality of physical accelerator resources of the first virtual computing platform to the second virtual computing platform to supplement the second plurality of physical accelerator resources of the second virtual computing platform.

2. The system of claim 1, further comprising a plurality of physical storage resources, wherein the virtual infrastructure management framework composes the plurality of virtual computing resources from the plurality of physical compute resources, the plurality of physical accelerator resources and the plurality of physical storage resources.

3. The system of claim 1, further comprising a plurality of physical memory resources, wherein the virtual infrastructure management framework composes the plurality of virtual computing resources from the plurality of physical compute resources, the plurality of physical accelerator resources and the plurality of physical memory resources.

4. The system claim 1, wherein a first one of the plurality of virtual computing resources comprises a first one of the physical compute resources and a first one of the physical accelerator resources, wherein a second one of the plurality of virtual computing resources comprises a second one of the physical compute resources and a second one of the physical accelerator resources, and wherein the virtual infrastructure management framework dynamically allocates the second one of the plurality of physical accelerator resources from the second virtual computing resource to the first virtual computing resource.

5. The system of claim 4, wherein a third one of the plurality of virtual computing resources comprises a third one of the physical compute resources and a third one of the physical accelerator resources, and wherein the virtual infrastructure management framework dynamically allocates the third one of the plurality of physical accelerator resources from the third virtual computing resource to the first virtual computing resource.

6. The system of claim 1, wherein the virtual infrastructure management framework to dynamically allocates at least one of the plurality of physical accelerator resources based on a service level agreement for the plurality of virtual computing resources.

7. The system of claim 1, wherein the virtual infrastructure management framework dynamically allocates at least one of the plurality of physical accelerator resources based on a resource utilization of one or more of the plurality of virtual computing resources.

8. The system of claim 1, wherein the plurality of accelerator resources comprises field programmable gate arrays.

9. The system of claim 1, wherein the virtual infrastructure manager framework comprises a data center hypervisor, and wherein the data center hypervisor presents each of the plurality of virtual computing resources as host computing systems.

10. The system of claim 1, further comprising a plurality of power supplies coupled to the plurality of physical compute resources and the plurality of physical accelerator resources.

11. The system of claim 1, wherein the fabric is an optical fabric configured to enable communication via a plurality of communication protocols.

12. A method comprising:
   composing a first virtual computing platform from a first plurality of physical compute resources and a first plurality of physical accelerator resources, the first plurality of physical compute resources coupled to the first plurality of physical accelerator resources via a fabric;
   composing a second virtual computing platform from a second plurality of physical compute resources and a second plurality of physical accelerator resources, the second plurality of physical compute resources coupled to the second plurality of physical accelerator resources via the fabric; and
   dynamically allocating at least one of the first plurality of physical accelerator resources of the first virtual computing platform to the second virtual computing platform to supplement the second plurality of physical accelerator resources of the second virtual computing platform.

13. The method of claim 12, further comprising composing the plurality of virtual computing resources from the plurality of physical compute resources, the plurality of physical accelerator resources and a plurality of physical storage resources.

14. The method of claim 12, further comprising composing the plurality of virtual computing resources from the plurality of physical compute resources, the plurality of physical accelerator resources and a plurality of physical memory resources.

15. The method claim 12, wherein a first one of the plurality of virtual computing resources comprises a first one of the physical compute resources and a first one of the physical accelerator resources; and wherein a second one of the plurality of virtual computing resources comprises a second one of the physical compute resources and a second one of the physical accelerator resources, the method comprising dynamically allocating the second one of the plurality of physical accelerator resources from the second virtual computing resource to the first virtual computing resource.

16. The method of claim 15, wherein a third one of the plurality of virtual computing resources comprises a third one of the physical compute resources and a third one of the physical accelerator resources, the method comprising dynamically allocating the third one of the plurality of physical accelerator resources from the third virtual computing resource to the first virtual computing resource.

17. The method of claim 12, further comprising dynamically allocating at least one of the plurality of physical accelerator resources based on a service level agreement for the plurality of virtual computing resources.

18. The method of claim 12, further comprising dynamically allocating at least one of the plurality of physical accelerator resources based on a resource utilization of one or more of the plurality of virtual computing resources.

19. The method of claim 12, wherein the plurality of accelerator resources comprising field programmable gate arrays.

20. The method of claim 12, further comprising composing the plurality of virtual computing resources at a data center hypervisor.

21. The method of claim 12, further comprising presenting each of the plurality of virtual computing resources as a host computing system.

22. At least one machine readable medium comprising a plurality of instructions that in response to being executed by a virtual infrastructure management framework of a data center cause the virtual infrastructure management framework to:
compose a first virtual computing platform from a first plurality of physical compute resources and a first plurality of physical accelerator resources, the first plurality of physical compute resources coupled to the first plurality of physical accelerator resources via a fabric;
compose a second virtual computing platform from a second plurality of physical compute resources and a second plurality of physical accelerator resources, the second plurality of physical compute resources coupled to the second plurality of physical accelerator resources via the fabric; and
dynamically allocate at least one of the first plurality of physical accelerator resources of the first virtual computing platform to a second virtual computing platform to supplement the second plurality of physical accelerator resources of the second virtual computing platform.

23. The at least one machine readable medium of claim 22, wherein the medium further comprises instructions that in response to being executed by the virtual infrastructure management framework cause the virtual infrastructure management framework to compose the plurality of virtual computing resources from the plurality of physical compute resources, the plurality of physical accelerator resources and a plurality of physical storage resources.

24. The at least one machine readable medium of claim 22, wherein the medium further comprises instructions that in response to being executed by the virtual infrastructure management framework cause the virtual infrastructure management framework to compose the plurality of virtual computing resources from the plurality of physical compute resources, the plurality of physical accelerator resources and a plurality of physical memory resources.

25. The at least one machine readable medium of claim 22, wherein a first one of the plurality of virtual computing resources comprises a first one of the physical compute resources and a first one of the physical accelerator resources; wherein a second one of the plurality of virtual computing resources comprises a second one of the physical compute resources and a second one of the physical accelerator resources, and wherein the medium further comprises instructions that in response to being executed by the virtual infrastructure management framework cause the virtual infrastructure management framework to dynamically allocate the second one of the plurality of physical accelerator resources from the second virtual computing resource to the first virtual computing resource.

* * * * *